(12) United States Patent
Thomas et al.

(10) Patent No.: US 8,701,389 B2
(45) Date of Patent: Apr. 22, 2014

(54) REAGENT INJECTOR CONTROL SYSTEM

(75) Inventors: Stephen M. Thomas, Laingsburg, MI (US); James J. Reynolds, III, Ypsilanti, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 215 days.

(21) Appl. No.: 13/311,806

(22) Filed: Dec. 6, 2011

(65) Prior Publication Data

US 2013/0140383 A1 Jun. 6, 2013

(51) Int. Cl.
*F01N 3/10* (2006.01)

(52) U.S. Cl.
USPC .................................. 60/286; 60/287; 60/295

(58) Field of Classification Search
USPC .................................... 60/286, 287, 295, 301
See application file for complete search history.

(56) References Cited

U.S. PATENT DOCUMENTS

| | | | | |
|---|---|---|---|---|
| 5,035,360 | A * | 7/1991 | Green et al. | 239/585.3 |
| 5,189,782 | A * | 3/1993 | Hickey | 29/602.1 |
| 5,438,968 | A * | 8/1995 | Johnson et al. | 123/446 |
| 6,409,102 | B1 * | 6/2002 | Luttrell et al. | 239/585.4 |
| 6,691,508 | B2 | 2/2004 | Sato et al. | |
| 6,941,746 | B2 | 9/2005 | Tarabulski et al. | |
| 7,178,328 | B2 | 2/2007 | Solbrig | |
| 7,410,615 | B2 | 8/2008 | Krug et al. | |
| 7,497,076 | B2 | 3/2009 | Funk et al. | |
| 7,726,118 | B2 | 6/2010 | Oberski et al. | |
| 8,024,922 | B2 | 9/2011 | Van Vuuren et al. | |
| 2005/0235632 | A1 | 10/2005 | Tarabulski et al. | |
| 2005/0282285 | A1 | 12/2005 | Radhamohan et al. | |
| 2006/0076437 | A1 * | 4/2006 | Dallmeyer | 239/585.1 |
| 2007/0006571 | A1 | 1/2007 | Vetrovec | |
| 2007/0057218 | A1 * | 3/2007 | Kuno | 251/129.21 |
| 2008/0022654 | A1 | 1/2008 | Broderick et al. | |
| 2008/0087008 | A1 | 4/2008 | Reba et al. | |
| 2008/0245058 | A1 * | 10/2008 | Boddy et al. | 60/286 |
| 2009/0113877 | A1 | 5/2009 | Van Nieuwstadt | |
| 2009/0114864 | A1 * | 5/2009 | Scheffer | 251/129.15 |
| 2009/0179087 | A1 * | 7/2009 | Martin et al. | 239/533.12 |
| 2009/0199540 | A1 * | 8/2009 | Kleinknecht | 60/274 |
| 2009/0206185 | A1 * | 8/2009 | Akisada et al. | 239/690 |
| 2009/0217644 | A1 | 9/2009 | Jung | |
| 2009/0255232 | A1 | 10/2009 | Barcin | |
| 2009/0301068 | A1 | 12/2009 | Fujita et al. | |

(Continued)

FOREIGN PATENT DOCUMENTS

| | | |
|---|---|---|
| JP | 2008-163856 | 7/2008 |
| JP | 2008-169711 | 7/2008 |
| JP | 4748664 | 8/2011 |

*Primary Examiner* — Thomas Denion
*Assistant Examiner* — Jorge Leon, Jr.
(74) *Attorney, Agent, or Firm* — Harness, Dickey & Pierce, P.L.C.

(57) ABSTRACT

A reagent injector control system includes a pulse width modulation (PWM) control module and an injector driver module. The PWM control module monitors current through a reagent injector during an injection control cycle, generates a PWM signal based on an amount of reagent to be injected during the injection control cycle, and at least one of selectively increases and selectively decreases a duty cycle of a PWM signal during the injection control cycle based on the current. The injector driver module selectively enables and disables the current based on the PWM signal. The reagent injector opens and injects a reagent into an exhaust system based on the current. The exhaust system receives exhaust output from an engine. The reagent reacts with nitrogen oxides (NOx).

19 Claims, 6 Drawing Sheets

(56) References Cited

U.S. PATENT DOCUMENTS

| | | | |
|---|---|---|---|
| 2010/0064668 A1* | 3/2010 | Beckmann et al. | 60/286 |
| 2010/0107615 A1 | 5/2010 | Chmielewski et al. | |
| 2010/0154385 A1 | 6/2010 | Perrin et al. | |
| 2010/0205937 A1 | 8/2010 | Duret et al. | |
| 2011/0061364 A1 | 3/2011 | Raman | |
| 2011/0083424 A1 | 4/2011 | Wang et al. | |
| 2011/0107742 A1 | 5/2011 | Igarashi et al. | |
| 2011/0192140 A1 | 8/2011 | Olivier et al. | |
| 2013/0074473 A1* | 3/2013 | Cosby et al. | 60/274 |

* cited by examiner

REAGENT INJECTOR CONTROL SYSTEM

FIELD

The present application relates to exhaust treatment systems and more particularly to reagent injector control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

To reduce the quantity of undesirable particulate matter and NOx emitted to the atmosphere during internal combustion engine operation, a number of exhaust aftertreatment systems have been developed. The need for exhaust aftertreatment systems particularly arises when diesel combustion processes are implemented.

One method used to reduce NOx emissions from internal combustion engines is known as selective catalytic reduction (SCR). SCR may include injecting a reagent into the exhaust stream of the engine to form a reagent and exhaust gas mixture that is subsequently passed through a reactor containing a catalyst capable of reducing the nitrogen oxides (NOx) concentration in the presence of the reagent. For example only, the catalyst may include activated carbon or metals, such as platinum, vanadium, or tungsten.

An aqueous urea solution is known to be an effective reagent in SCR systems for diesel engines. However, use of an aqueous solution and other reagents may have disadvantages. Urea is highly corrosive and may attack mechanical components of the SCR system. Urea also tends to solidify upon prolonged exposure to high temperatures, such as encountered in diesel exhaust systems. A concern exists because the reagent creates a deposit that is not used to reduce the NOx.

Urea injection systems for the treatment of diesel engine exhaust vary substantially in that different original equipment manufacturers (OEMs) specify reagent injectors having different ranges of injection flow rates. When reviewing several different OEM specifications together, the entire range of reagent injection flow rates to be provided may be expansive. As such, manufacturers of reagent injectors presently provide several different injectors each having a similar total flow rate range but sized such that the maximum and minimum values are spaced apart from one another.

A reagent injector includes a pintle that actuates axially within the reagent injector to open and close the reagent injector. A solenoid coil of the reagent injector produces a magnetic field based on current flow through the solenoid coil. The pintle compresses a return spring based on the magnetic field to open the reagent injector. When the magnetic field collapses, the return spring biases the pintle to close the reagent injector.

The pintle, however, may become magnetized over time. If the pintle becomes magnetized, the reagent injector may close at a slower rate. Additionally, current flowing through the solenoid coil generates heat. As described above, the reagent may react negatively to heat. As such, a need exists to minimize heat generated for opening a reagent injector. A need also exists to minimize a probability of the pintle becoming permanently magnetized.

SUMMARY

This section provides a general summary of the disclosure, and is not a comprehensive disclosure of its full scope or all of its features.

A reagent injector control system includes a pulse width modulation (PWM) control module and an injector driver module. The PWM control module monitors current through a reagent injector during an injection control cycle, generates a PWM signal based on an amount of reagent to be injected during the injection control cycle, and at least one of selectively increases and selectively decreases a duty cycle of a PWM signal during the injection control cycle based on the current. The injector driver module selectively enables and disables the current based on the PWM signal. The reagent injector opens and injects a reagent into an exhaust system based on the current. The exhaust system receives exhaust output from an engine. The reagent reacts with nitrogen oxides (NOx).

In other features, a reagent injector control system includes a pulse width modulation (PWM) control module and an injector driver module. The PWM control module sets a duty cycle of a PWM signal to 100 percent to open a reagent injector during an injection control cycle and selectively sets the duty cycle of the PWM signal to less than 100 percent to hold the reagent injector open during the injection control cycle. The injector driver module outputs current to the reagent injector based on the duty cycle of the PWM signal. The reagent injector opens and injects a reagent into an exhaust system based on the current. The exhaust system receives exhaust output from an engine. The reagent reacts with nitrogen oxides (NOx).

In still other features, a reagent injector includes a reagent inlet, a coil and a pintle. The reagent inlet is for receiving a reagent for injection into an exhaust system. The exhaust system receives exhaust output from an engine. The reagent reacts with nitrogen oxides (NOx). The coil generates a magnetic field based on current flow through the coil. The pintle moves axially based on the magnetic field. The pintle includes a pintle head and a pintle shaft. The pintle head includes a solenoid grade material having at least 1 percent silicon per unit weight. The pintle shaft is coupled to the pintle head.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

It should be understood that although the present teachings may be described in connection with diesel engines and the reduction of NOx emissions, the present teachings can be used in connection with any one of a number of exhaust streams, such as, by way of non-limiting example, those from diesel, gasoline, turbine, fuel cell, jet or any other power source outputting a discharge stream. Moreover, the present teachings may be used in connection with the reduction of any one of a number of undesired emissions. For example, injection of hydrocarbons for the regeneration of diesel particulate filters is also within the scope of the present disclosure. For additional description, attention should be directed to commonly-assigned U.S. Patent Application Publication No. 2009/0179087A1, filed Nov. 21, 2008, entitled "Method And Apparatus For Injecting Atomized Fluids", which is incorporated herein by reference.

Figure 1:
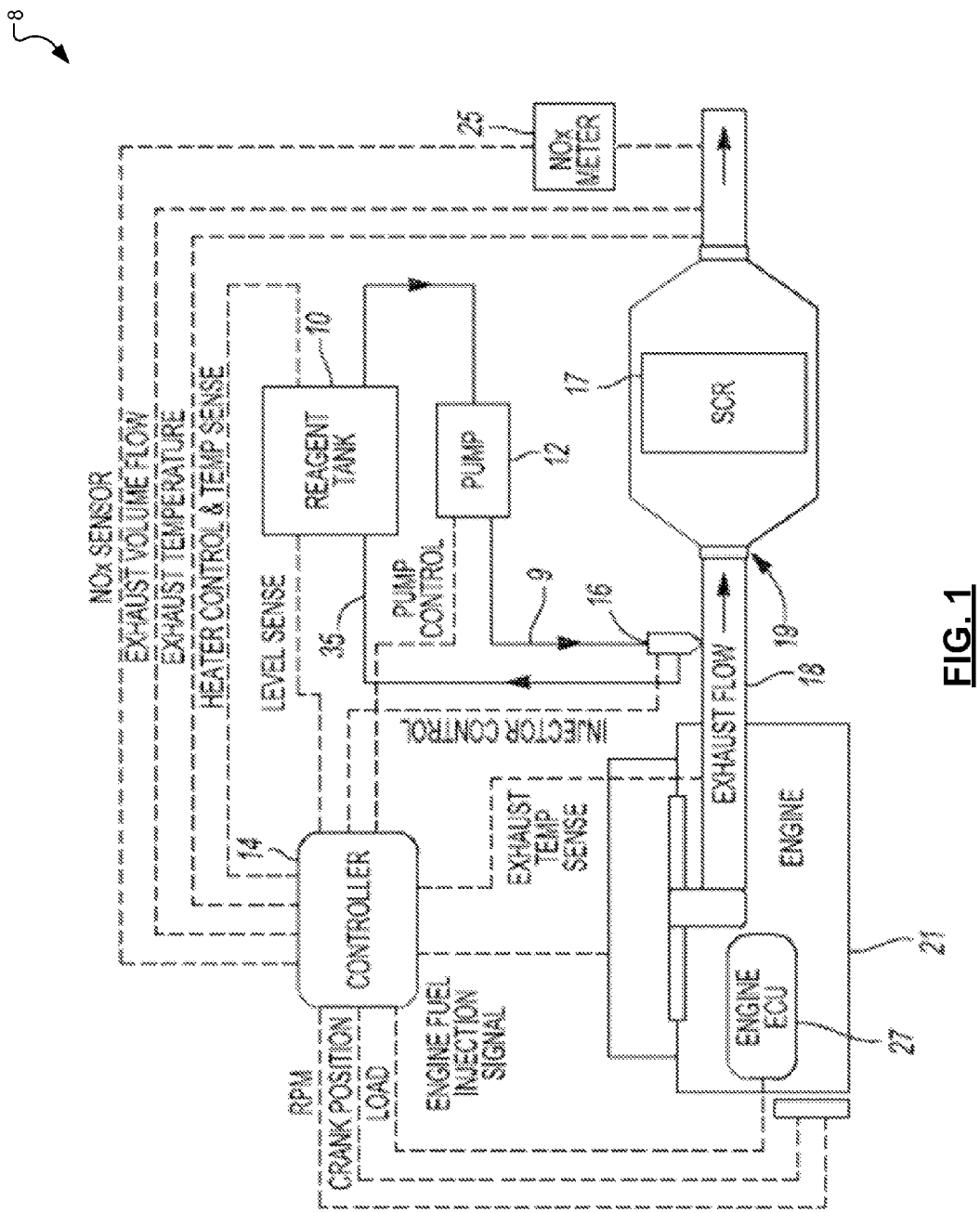
FIG. 1 is a schematic diagram of an example internal combustion engine with an emissions control system equipped with a reagent dosing system.

With reference to FIG. 1, an exhaust control system 8 for reducing NOx in exhaust output by a diesel engine 21 is presented. In FIG. 1, solid lines between elements of the system 8 denote fluid lines for reagent, and dashed lines between elements denote electrical connections.

The system 8 may include a reagent tank 10 for holding the reagent and a delivery module 12 for delivering the reagent from the tank 10. The reagent may be a urea solution, a hydrocarbon, an alkyl ester, alcohol, an organic compound, water, or the like and can be a blend or combination thereof. It should also be appreciated that one or more reagents can be available in the system 8 and can be used singly or in combination.

The tank 10 and the delivery module 12 may form an integrated reagent tank/delivery module. The system 8 also includes an electronic injection controller 14, a reagent injector 16, and an exhaust system 19. The exhaust system 19 includes an exhaust conduit 18 providing exhaust output by the diesel engine 21 to a catalyst 17. The catalyst 17 may include a selective catalytic reduction (SCR) catalyst. The exhaust system 19 may include one or more other catalysts, such as an oxidation catalyst.

The delivery module 12 may comprise a pump that supplies reagent from the tank 10 via a supply line 9. The tank 10 may be polypropylene, epoxy coated carbon steel, PVC, or stainless steel and sized according to the application (e.g., vehicle size, intended use of the vehicle, and the like). A pressure regulator (not shown) may be provided to maintain the pressure of the reagent supplied to the reagent injector 16 at predetermined pressure setpoint (e.g., relatively low pressures of approximately 60-80 psi, or in some embodiments a pressure of approximately 60-150 psi). The pressure regulator may be located in a return line 35 from the reagent injector 16 to the tank 10. A pressure sensor may be provided in the supply line 9 leading to the reagent injector 16. The system may also incorporate various freeze protection strategies to thaw frozen reagent or to prevent the reagent from freezing.

During system operation, regardless of whether or not the reagent injector 16 is injecting reagent into the exhaust stream, reagent may be circulated continuously between the tank 10 and the reagent injector 16 to cool the reagent injector 16 and minimize the dwell time of the reagent in the reagent injector 16 so that the reagent remains cool. Continuous reagent circulation may be necessary for temperature-sensitive reagents, such as aqueous urea, which may solidify upon exposure to temperatures of 300° C. to 650° C. as may be experienced in an engine exhaust system.

Furthermore, it may be desirable to keep the reagent mixture below 140° C. and preferably in a lower operating range between 5° C. and 95° C. to ensure that solidification of the reagent is prevented. Solidified reagent, if allowed to form, may foul the moving parts and openings of the reagent injector 16.

The amount of reagent to be injected may be varied based on engine load, engine speed, exhaust gas temperature, exhaust gas flow, engine fuel injection timing, desired NOx reduction, barometric pressure, relative humidity, EGR (exhaust gas recirculation) flow rate, and/or engine coolant temperature. A NOx sensor or meter 25 is positioned downstream from the catalyst 17. The NOx sensor 25 is operable to output a signal indicative of the amount of NOx in the exhaust to an engine control unit 27.

Exhaust gas temperature, exhaust gas flow and exhaust back pressure and other operating parameters may be measured by various sensors. All or some of the operating parameters may be supplied from the engine control unit 27 to the electronic injection controller 14 via an engine/vehicle databus. The electronic injection controller 14 could also be included as part of the engine control unit 27.

Figure 2:
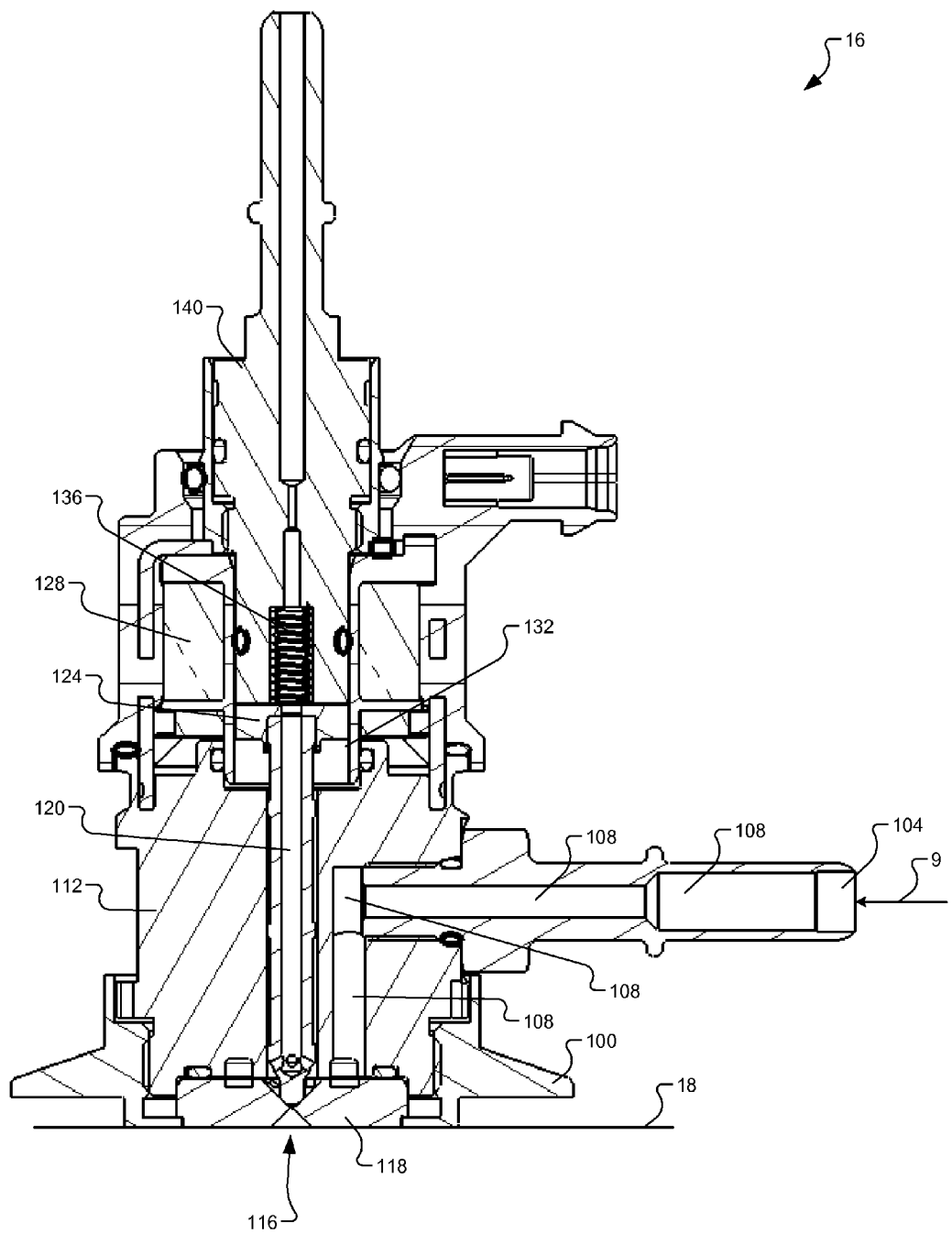
FIG. 2 is a cross-sectional diagram of an example reagent injector.

Referring now to FIG. 2, a cross-sectional diagram of an example of the reagent injector 16 is presented. The reagent injector 16 is coupled to the exhaust conduit 18 by a retainer, such as a retainer nut 100. The reagent injector 16 is coupled to the exhaust conduit 18 upstream of the catalyst 17. The reagent injector 16 includes an inlet conduit 104 where the reagent injector 16 receives reagent for injection. A reagent path 108 is formed in a lower body 112 of the reagent injector 16.

Reagent flows through the reagent path 108 and is injected into the exhaust conduit 18 via an orifice 116 in an orifice plate 118. The reagent is injected when a pintle shaft 120 of the reagent injector 16 is in an open position. When the pintle shaft 120 is in a closed position, the orifice 116 is blocked such that the reagent is not injected. The pintle shaft 120 may be made of, for example, CPM S90V type stainless steel.

The pintle shaft 120 is mechanically coupled with a pintle head 124. A magnetic field that is produced by a solenoid coil 128 as current flows through the solenoid coil 128 actuates the pintle head 124 axially within a chamber 132. Because the pintle head 124 and the pintle shaft 120 are mechanically coupled, actuation of the pintle head 124 also causes the pintle shaft to move axially.

A return spring 136 applies a force to the pintle head 124 in the direction of the orifice 116. When current is not applied to the solenoid coil 128, the return spring 136 biases the pintle shaft 120 to the closed position to prevent reagent injection. Current flowing through the solenoid coil 128 produces a magnetic field that can overcome the force of the return spring 136 and compress the return spring 136. The return spring 136 may be compressed until the pintle head 124 contacts a bottom face of a pole piece 140, at which point the pintle shaft 120 is in the open position. When current through the solenoid coil 128 is removed, the return spring 136 returns the pintle shaft 120 to the closed position to close the reagent injector 16.

The pintle head 124 may be made of 430F type stainless steel or 430FR type stainless steel. The pintle head 124 may be made of another suitable type of solenoid grade stainless steel or another suitable type of stainless steel having at least 1 percent silicon. The pintle head 124 being made of such a material may aid in preventing the pintle head 124 from being permanently magnetized. Permanent magnetization of the pintle head 124 may increase (slow) the period necessary for the return spring 136 to actuate the pintle shaft 120 from the open position to the closed position. As the period to actuate the pintle shaft 120 from the open position to the closed position increases, the amount of reagent injected by the reagent injector 16 during closing of the reagent injector 16 also increases. The pintle shaft 120 and the pintle head 124 will be collectively referred to as the pintle.

Figure 3:
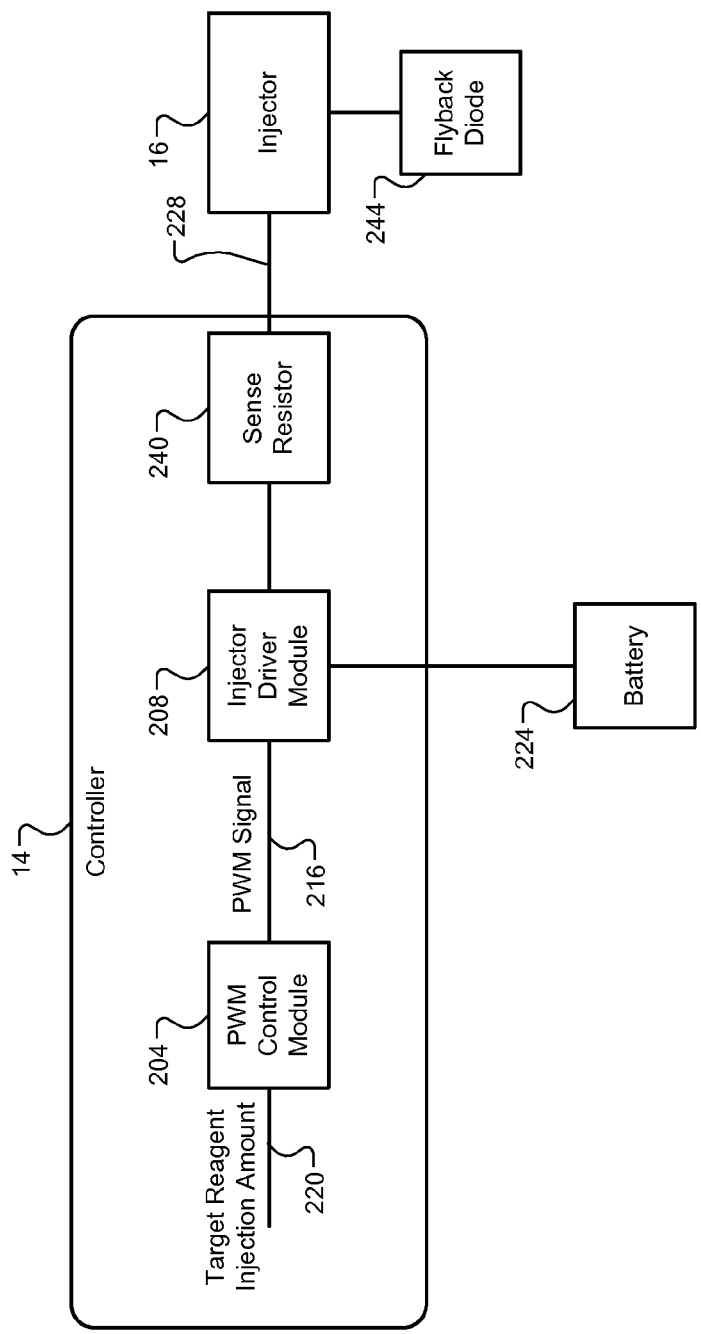
FIG. 3 is a functional block diagram of an example injector control system according to the present disclosure.

Referring now to FIG. 3, a functional block diagram of an example injection control system is presented. The electronic injection controller 14 may include a pulse width modulation (PWM) control module 204 and an injector driver module 208.

The PWM control module 204 generates a PWM signal 216. The PWM control module 204 may generate the PWM signal 216 for a given PWM control cycle based on a target reagent injection amount 220 determined for an injection control cycle. When the reagent is supplied to the reagent injector 16 at approximately a constant pressure, the target reagent injection amount 220 can be injected when the reagent injector 16 is open for a predetermined period during the injection control cycle.

The target reagent injection amount 220 is determined/updated for each injection control cycle. An injection control cycle may refer to the predetermined period between the times when two consecutive reagent injections begin. A PWM control cycle may refer to the predetermined period between two consecutive times when the PWM control module 204 generates/updates the PWM signal 216. The PWM control cycles are less than the injection control cycles. In other words, the PWM control module 204 generates/updates the PWM signal 216 more frequently than the target reagent injection amount 220 is determined/updated. The frequency at which the target reagent injection amount 220 is determined/updated may be, for example, between 1 Hertz (Hz) and 10 Hz or another suitable frequency. A frequency of 5 Hz corresponds to 200 millisecond injection control cycles. By way of contrast, the frequency at which the PWM control module 204 generates/updates the PWM signal 216 may be, for example, 100 Hz (corresponding to PWM control cycles of 10 ms) or more. The target reagent injection amount 220 for a given injection control may be set, for example, based on one or more operating parameters, such as temperature of the catalyst 17, engine load, an amount of NOx in the exhaust, and/or one or more other operating parameters.

The injector driver module 208 (e.g., see FIGS. 5 and 6) includes one or more switches that switch based on the state of the PWM signal 216. The injector driver module 208 receives power from one or more sources, such as a battery 224. The injector driver module 208 regulates a voltage 228 that is applied to a terminal of the reagent injector 16. Current flows through the reagent injector 16 based on the voltage 228. The reagent injector 16 opens and closes based on the current through the reagent injector 16.

Figure 4:
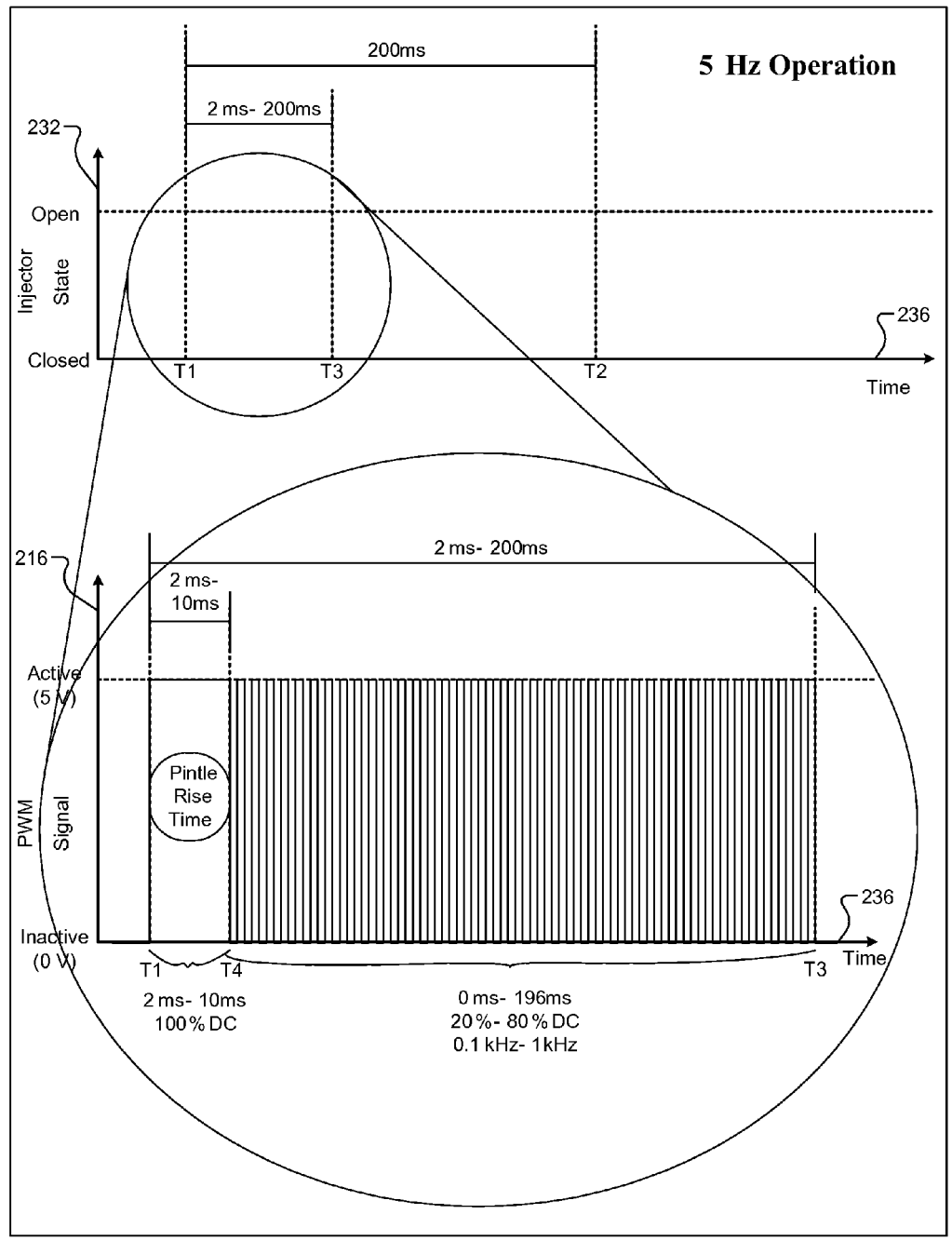
FIG. 4 includes example graphs of a state of a reagent injector and a pulse width modulation (PWM) signal according to the present disclosure.

FIG. 4 includes example graphs of the PWM signal 216 and state 232 of the reagent injector 16 as functions of time 236. The example graphs of FIG. 4 are based on an injection control frequency of 5 Hz, but the injection control frequency can be another suitable frequency.

One injection control cycle (200 ms) occurs between time T1 and time T2 in the upper graph. During the one injection control cycle, the reagent injector 16 may be open between time T1 and time T3 to achieve the target reagent injection amount 220 for the injection control cycle.

Referring now to FIGS. 3 and 4, the PWM control module 204 sets the PWM signal 216 to one of an active state (e.g., 5 Volts) and an inactive state (e.g., 0 Volts) at a given time. The PWM control module 204 controls the duty cycle of the PWM signal 216 to control the voltage 228 and therefore the current through the reagent injector 16. The duty cycle of the PWM signal 216 may refer to the ratio of the period that the PWM signal 216 is in the active state during a PWM control cycle to the length (period) of the PWM control cycle.

Each injection control cycle includes a period during which the reagent injector 16 is open (an open period) and a period during which the reagent injector is closed (a closed period). In the upper graph of FIG. 4, the injection control cycle between times T1 and T2 includes an example open period between times T1 and T3 and an example closed period between times T3 and T2. As the target reagent injection amount 220 for an injection control cycle increases, the open period of the injection control cycle also increases.

The open period of each injection control cycle includes an opening period and a holding period. The reagent injector 16 transitions from closed to open during the opening period. The reagent injector 16 is held open during the holding period. When the holding period ends, a closing period begins. The reagent injector 16 transitions from open to closed during the closing period. The closed period begins when the reagent injector 16 is closed. The reagent injector 16 remains closed until, at the earliest, a next injection control cycle begins.

In the lower graph of FIG. 4, the example open period occurs between times T1 and T3 as in the upper graph of FIG. 3. In the lower graph, an example opening period occurs between times T1 and T4, and an example holding period occurs between times T4 and T3. The opening period is a predetermined period. For example only, the predetermined period may be set based on characteristics of the reagent injector 16 (e.g., the return spring 136) and may be, for example, between 2 ms and 10 ms or another suitable period.

During the opening period, the PWM control module 204 sets the duty cycle of the PWM signal 216 to 100 percent. In this manner, the PWM signal 216 is maintained in the active state throughout the opening period. Maintaining the PWM signal 216 in the active state causes current through the reagent injector 16 to be greater than a predetermined holding current. In particular, the duty cycle of the PWM signal 216 controls the voltage 228, and current flows through the reagent injector 16 based on the voltage 228. The predetermined holding current may refer to current necessary to maintain the reagent injector 16 open when the reagent injector 16 is already open. The predetermined holding current flowing through the reagent injector 16 may impose a force on the pintle that is slightly greater than the force applied by the return spring 136 (in the opposite direction) when the reagent injector 16 is open.

During the holding period, the PWM control module 204 regulates the duty cycle of the PWM signal 216 to maintain the current through the reagent injector 16 at approximately the predetermined holding current. A sense resistor 240, a current sensor, etc. may be used to measure the current through the reagent injector 16. The PWM control module 204 may vary the duty cycle of the PWM signal 216 during the holding period based on the measured current to maintain the current at approximately the predetermined holding current. The PWM module 204 may limit the duty cycle of the PWM signal 216 to between 20 percent and 80 percent or another suitable range during the holding period.

The current through the reagent injector 16 during the holding period is less than the current through the reagent injector 16 during the opening period. This aids in minimizing the likelihood that the pintle head 124 will become permanently magnetized. Additionally, as the reagent injector 16 generates resistive (I²R) heat when current is applied, the lower current may minimize the temperature of the reagent injector 16.

A flyback diode 244 is connected in parallel with the reagent injector 16. When the PWM signal 216 is in the inactive state, the injector driver module 208 blocks current flow to the reagent injector 16 and the flyback diode 244 discharges current (and collapses the magnetic field). For example only, the flyback diode 244 may include a zener diode, a low voltage diode, or another suitable type of diode. Using a zener diode as the flyback diode 244 may collapse the magnetic field and discharge current faster than other types of diodes.

Figure 5:
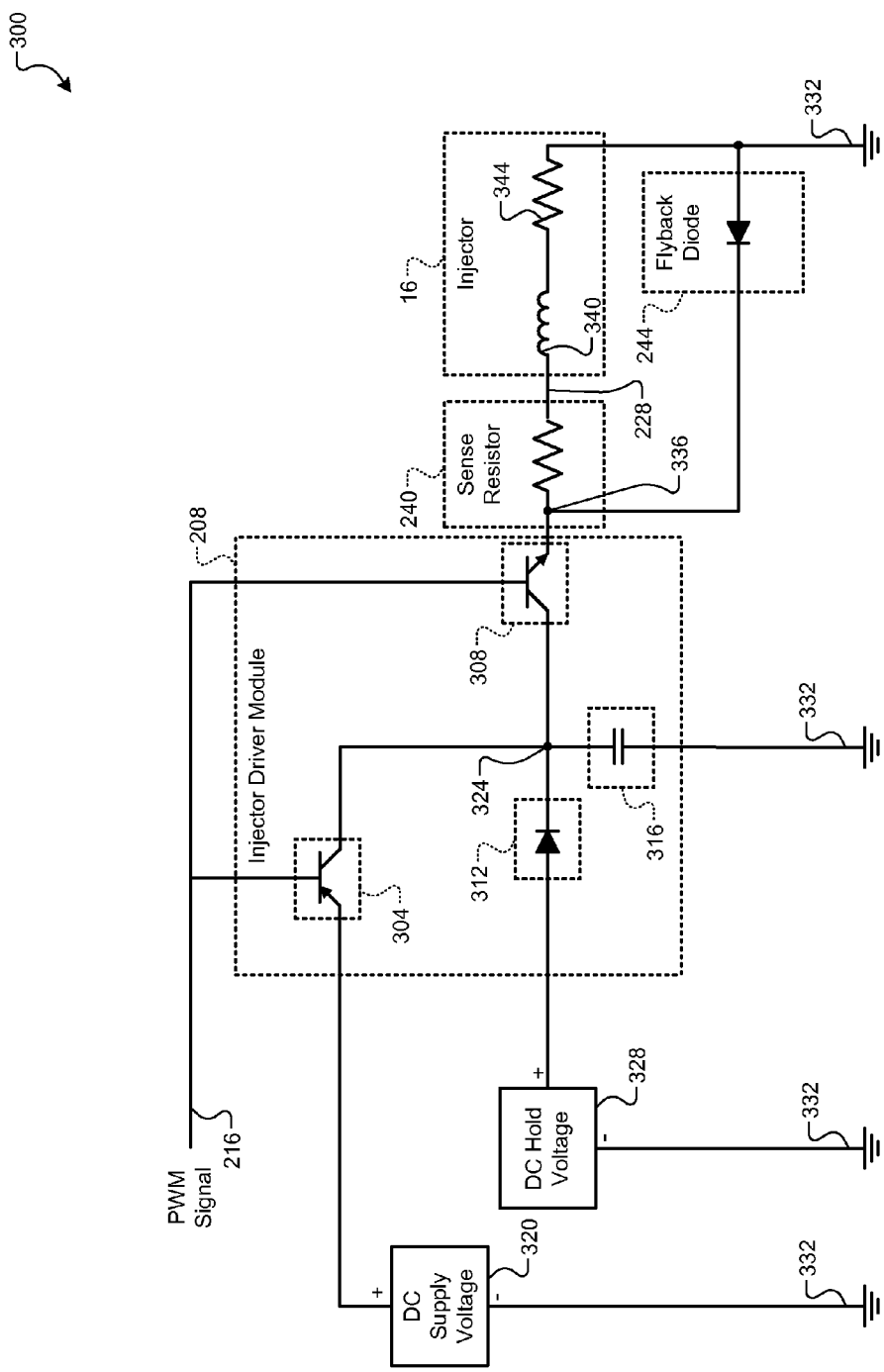
FIGS. 5 and 6 are schematics of example injector control systems according to the present disclosure.

Referring now to FIG. 5, a schematic of an example injector control system 300 is presented. The injector driver module 208 may include a first switching device 304, a second switching device 308, a diode 312, and a capacitor 316.

A DC supply voltage 320 may be applied to a first terminal of the first switching device 304, and a second terminal of the first switching device 304 may be connected to a node 324. The PWM signal 216 is connected to the control terminal of the first switching device 304. For example only, the first switching device 304 may include a PNP transistor as shown in the example of FIG. 5 or another suitable type of switching device. The DC supply voltage 320 may be generated from power from the battery 224 (e.g., using a voltage regulator) or another suitable source. The DC supply voltage 320 may be 24 Volts DC or another suitable voltage.

A DC hold voltage 328 is applied to the anode of the diode 312, and the cathode terminal of the diode 312 is connected to the node 324. The DC hold voltage 328 is less than the DC supply voltage 320. The DC hold voltage 328 may be generated from power from the battery 224 (e.g., using a voltage regulator) or another suitable source. For example only, the DC hold voltage may be approximately 13.5 Volts DC or another suitable voltage. A first terminal of the capacitor 316 is connected to the node 324, and a second terminal of the capacitor 316 is connected to a ground potential 332.

A first terminal of the second switching device 308 is connected to the node 324, and a second terminal of the second switching device 308 may be connected to a second node 336. The PWM signal 216 is also connected to the control terminal of the second switching device 308. For example only, the second switching device 308 may include a NPN transistor as shown in the example of FIG. 5 or another suitable type of switching device.

A first terminal of the sense resistor 240 may be connected to the second node 336, and a second terminal of the sense resistor 240 may be connected to a first terminal of the reagent injector 16. Current through the reagent injector 16 may be measured based on the voltage across the sense resistor 240 and the resistance of the sense resistor 240.

The reagent injector 16 can be represented as an inductor 340 and a resistor 344 connected in series. A second terminal of the reagent injector 16 is connected to the ground potential 332. The anode of the flyback diode 244 may be connected to the ground potential 332, and the cathode of the flyback diode 244 may be connected to the second node 336.

When the PWM signal 216 is in the inactive state, the first switching device 304 is ON, and the second switching device 308 is OFF. The capacitor 316 therefore charges toward the DC supply voltage 320 when the PWM signal 216 is in the inactive state. Thus, when the PWM signal 216 is transitioned from the inactive state to the active state, the voltage 228 will be greater than the DC hold voltage 328.

When the PWM signal 216 is in the active state, the first switching device 304 is OFF, and the second switching device 308 is ON. The capacitor 316 therefore discharges, and current flows through the reagent injector 16. As the capacitor 316 discharges, the voltage 228 ramps down toward the DC hold voltage 328. The voltage 228 may eventually be approximately equal to the DC hold voltage 328.

Figure 6:
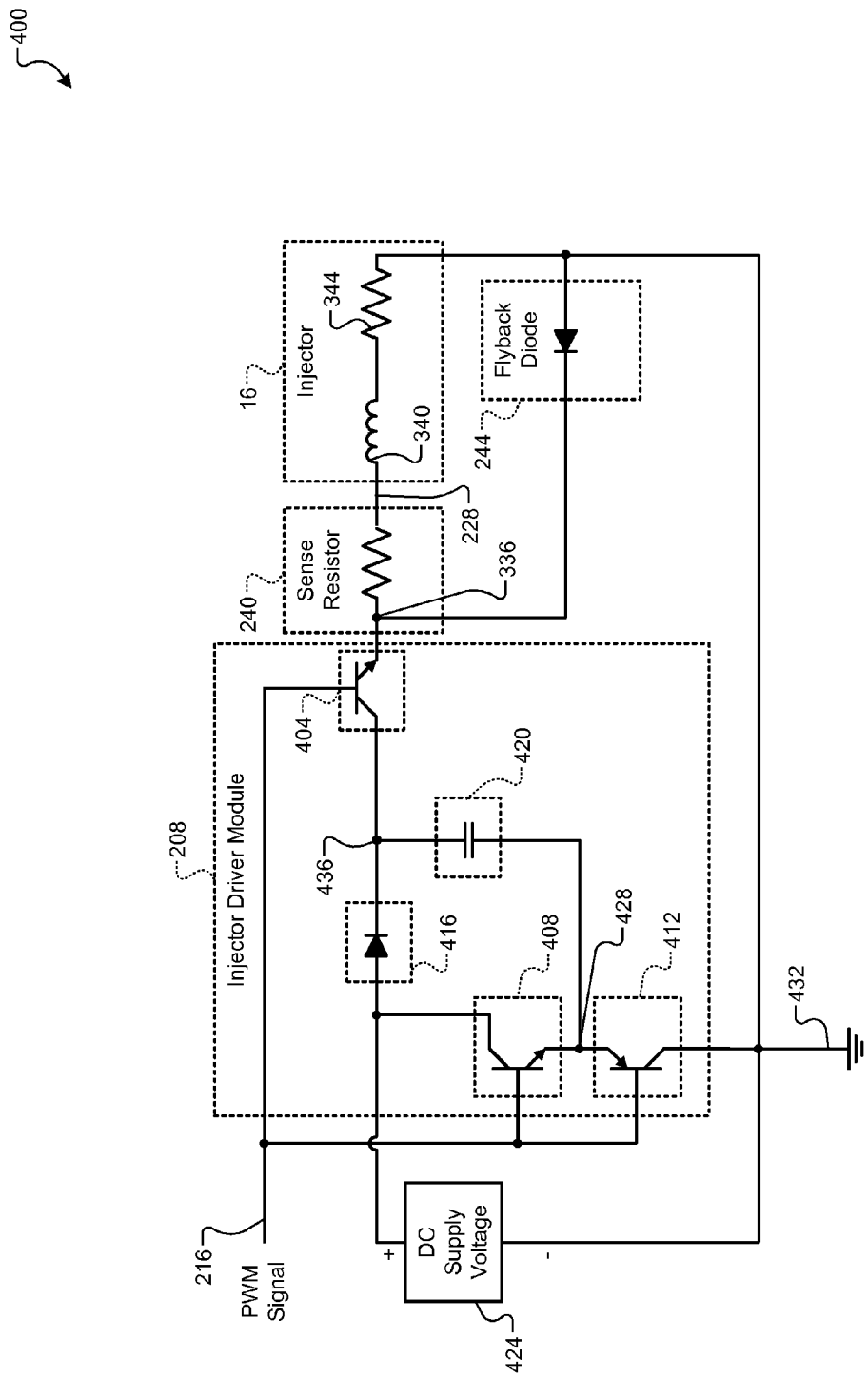

Referring now to FIG. 6, another schematic of an example injector control system 400 is presented. The injector driver module 208 may include a first switching device 404, a second switching device 408, a third switching device 412, a diode 416, and a capacitor 420.

A first terminal of the second switching device 408 may be connected to a DC supply voltage 424, and a second terminal of the second switching device 408 may be connected to a node 428. A first terminal of the third switching device 412 may be connected to the node 428, and a second terminal of the third switching device 412 may be connected to a ground potential 432. The anode of the diode 416 may be connected to the DC supply voltage 424, and the cathode of the diode 416 may be connected to a node 436. The capacitor may be connected at one terminal to the node 436 and at another terminal to the node 428.

A first terminal of the first switching device 404 may be connected to the node 436, and a second terminal of the first switching device 404 may be connected to the second node 336. The PWM signal 216 is connected to the control terminals of the first, second, and third switching devices 404, 408, and 412. For example only, as shown in FIG. 6, the first, second, and third switching devices 404, 408, and 412 may be NPN, NPN, and PNP switches, respectively, or other suitable switching devices.

When the PWM signal 216 is in the inactive state, the first switching device 404 is OFF and blocks current flow to the reagent injector 16. The second switching device 408 is also OFF when the PWM signal 216 is in the inactive state. The third switching device 412, however, is ON when the PWM signal 216 is in the inactive state. The capacitor 420 therefore charges toward the DC supply voltage 424 when the PWM signal 216 is in the inactive state.

When the PWM signal 216 is in the active state, the first switching device 404 is ON, the second switching device 408 is ON, and the third switching device 412 is OFF. Therefore, when the PWM signal 216 is in the active state, the capacitor 420 and the DC supply voltage 424 appear to the reagent injector 16 as being in series such that the voltage 228 is approximately equal to the sum of the DC supply voltage 424 and the voltage on the capacitor 420. The capacitor 420 discharges while the PWM signal 216 is in the active state and the voltage 228 decreases toward the DC supply voltage 424.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A reagent injector control system for a vehicle, comprising:
    a first electronic circuit that monitors current through a reagent injector during an injection control cycle, that generates a pulse width modulation (PWM) signal based on an amount of reagent to be injected during the injection control cycle, and that at least one of selectively increases and selectively decreases a duty cycle of the PWM signal during the injection control cycle based on a comparison of the current and a predetermined current;
    a second electronic circuit that selectively enables and disables the current based on the PWM signal; and
    a sense resistor having a first terminal connected to the second electronic circuit and a second terminal connected to the reagent injector, wherein the sense resistor is separate from the reagent injector,
    wherein the first electronic circuit determines the current based on a voltage across the sense resistor,
    wherein the reagent injector opens and injects a reagent into an exhaust system based on the current,
    wherein the exhaust system receives exhaust output from an engine, and
    wherein the reagent reacts with nitrogen oxides (NOx).

2. The reagent injector control system of claim 1 further comprising:
    the reagent injector; and
    a flyback diode connected in parallel with the reagent injector between the second terminal of the sense resistor and a ground potential.

3. The reagent injector control system of claim 2 wherein the flyback diode includes a zener diode.

4. The reagent injector control system of claim 2 wherein the reagent injector comprises:
    a coil that generates a magnetic field based on current flow through the coil;
    a pintle that moves axially based on the magnetic field and that includes:
        a pintle head that consists of 430F type stainless steel; and
        a pintle shaft that is coupled to the pintle head.

5. The reagent injector control system of claim 2 wherein the reagent injector comprises:
    a coil that generates a magnetic field based on current flow through the coil;
    a pintle that moves axially based on the magnetic field and that includes:
        a pintle head that consists of 430FR type stainless steel; and
        a pintle shaft that is coupled to the pintle head.

6. The reagent injector control system of claim 2 wherein the reagent injector comprises:
    a coil that generates a magnetic field based on current flow through the coil;
    a pintle that moves axially based on the magnetic field and that includes:
        a pintle head that includes a solenoid grade material having at least 1 percent silicon per unit weight; and
        a pintle shaft that is coupled to the pintle head.

7. The reagent injector control system of claim 1 wherein the first electronic circuit sets the duty cycle of the PWM signal to 100 percent for a predetermined period during the injection control cycle and at least one of selectively increases and selectively decreases the duty cycle of the PWM signal based on the comparison of the current and the predetermined current after the predetermined period during the injection control cycle.

8. The reagent injector control system of claim 1 wherein the second electronic circuit includes at least one capacitor that charges when the PWM signal is in an inactive state and that discharges when the PWM signal is in an active state.

9. The reagent injector control system of claim 8 wherein the second electronic circuit comprises:
    at least one switching device configured to block current flow to the reagent injector when the PWM signal is in the inactive state and to enable current flow to the reagent injector when the PWM signal is in an active state; and
    at least one other switching device configured to allow the charging of the capacitor when the PWM signal is in the inactive state.

10. A reagent injector control system for a vehicle, comprising:
    a first electronic circuit that sets a duty cycle of a pulse width modulation (PWM) signal to 100 percent to open a reagent injector during an injection control cycle and that selectively sets the duty cycle of the PWM signal to less than 100 percent to hold the reagent injector open during the injection control cycle;
    a second electronic circuit that outputs current to the reagent injector based on the duty cycle of the PWM signal; and
    a sense resistor having a first terminal connected to the second electronic circuit and a second terminal connected to the reagent injector, wherein the sense resistor is separate from the reagent injector,
    wherein the first electronic circuit determines the current based on a voltage across the sense resistor,
    wherein, based on a comparison of the current and a predetermined current, the first electronic circuit sets the duty cycle of the PWM signal to less than 100 percent to hold the reagent injector open during the injection control cycle,
    wherein the reagent injector opens and injects a reagent into an exhaust system based on the current,
    wherein the exhaust system receives exhaust output from an engine, and
    wherein the reagent reacts with nitrogen oxides (NOx).

11. The reagent injector control system of claim 10 further comprising:
   the reagent injector; and
   a flyback diode connected in parallel with the reagent injector between the second terminal of the sense resistor and a ground potential.

12. The reagent injector control system of claim 11 wherein the flyback diode includes a zener diode.

13. The reagent injector control system of claim 10 wherein the first electronic circuit sets the duty cycle of the PWM signal to 100 percent for a predetermined period to open the reagent injector.

14. The reagent injector control system of claim 10 wherein the second electronic circuit includes at least one capacitor that charges when the PWM signal is in an inactive state and that discharges when the PWM signal is in an active state.

15. The reagent injector control system of claim 14 wherein the second electronic circuit comprises:
   at least one switching device configured to block current flow to the reagent injector when the PWM signal is in the inactive state and to enable current flow to the reagent injector when the PWM signal is in an active state; and
   at least one other switching device configured to allow the charging of the capacitor when the PWM signal is in the inactive state.

16. A reagent injector control system for a vehicle, comprising:
   a reagent injector;
   a first electronic that determines a current flow through the reagent injector during an injection control cycle, that generates a pulse width modulation (PWM) signal based on an amount of reagent to be injected during the injection control cycle, and that at least one of selectively increases and selectively decreases a duty cycle of the PWM signal during the injection control cycle based on the current;
   a second electronic circuit that selectively enables and disables the current based on the PWM signal;
   a sense resistor that is separate from the reagent injector, that includes a first terminal connected to the second electronic circuit, and that includes a second terminal connected to the reagent injector,
   wherein the first electronic circuit determines the current based on a voltage across the sense resistor; and
   a flyback diode connected in parallel with the reagent injector between the second terminal of the sense resistor and a ground potential,
   wherein the reagent injector opens and injects a reagent into an exhaust system based on the current,
   wherein the exhaust system receives exhaust output from an engine, and
   wherein the reagent reacts with nitrogen oxides (NOx).

17. The reagent injector control system of claim 16 wherein the flyback diode includes a zener diode.

18. The reagent injector control system of claim 16 wherein the second electronic circuit includes at least one capacitor that charges when the PWM signal is in an inactive state and that discharges when the PWM signal is in an active state.

19. The reagent injector control system of claim 18 wherein the second electronic circuit comprises:
   at least one switching device configured to block current flow to the reagent injector when the PWM signal is in the inactive state and to enable current flow to the reagent injector when the PWM signal is in an active state; and
   at least one other switching device configured to allow the charging of the capacitor when the PWM signal is in the inactive state.

\* \* \* \* \*